United States Patent
Sima et al.

(10) Patent No.: US 11,887,403 B1
(45) Date of Patent: Jan. 30, 2024

(54) MOUTH SHAPE CORRECTION MODEL, AND MODEL TRAINING AND APPLICATION METHOD

(71) Applicant: NANJING SILICON INTELLIGENCE TECHNOLOGY CO., LTD., Jiangsu (CN)

(72) Inventors: Huapeng Sima, Nanjing (CN); Guo Yang, Jiangsu (CN)

(73) Assignee: NANJING SILICON INTELLIGENCE TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/338,460

(22) Filed: Jun. 21, 2023

(30) Foreign Application Priority Data

Aug. 15, 2022 (CN) .......................... 202210971051.3

(51) Int. Cl.
 *G06V 20/40* (2022.01)
 *G06V 40/16* (2022.01)
(52) U.S. Cl.
 CPC ............ *G06V 40/171* (2022.01); *G06V 20/46* (2022.01)
(58) Field of Classification Search
 CPC ............................. G06V 40/171; G06V 20/46
 See application file for complete search history.

(56) References Cited

U.S. PATENT DOCUMENTS

| 2021/0343065 | A1* | 11/2021 | Lin | .......................... G06T 7/90 |
| 2022/0093133 | A1 | 3/2022 | Zhao et al. | |

FOREIGN PATENT DOCUMENTS

| CN | 110136698 A | 8/2019 |
| CN | 110807825 A | 2/2020 |
| CN | 111741326 A | 10/2020 |
| CN | 114187547 A | 3/2022 |
| CN | 114359450 A | 4/2022 |

OTHER PUBLICATIONS

First Office Action and Search Report dated Sep. 20, 2022, in corresponding Chinese Application No. 202210971051.3.
Notification of Grant and Search Report dated Sep. 20, 2022, in corresponding Chinese Application No. 202210971051.3.

* cited by examiner

*Primary Examiner* — Sam Bhattacharya
(74) *Attorney, Agent, or Firm* — Harness, Dickey & Pierce, P.L.C.

(57) ABSTRACT

Embodiments of this disclosure provide a mouth shape correction model, and model training and application methods. The model includes a mouth feature extraction module, a key point extraction module, a first video module, a second video module, and a discriminator. The training method includes: based on a first original video and a second original video, extracting corresponding features by using various modules in the model to train the model; and when the model meets a convergence condition, completing the training to generate a target mouth shape correction model. The application method includes: inputting a video in which a mouth shape of a digital-human actor is to be corrected and corresponding audio into a mouth shape correction model, to obtain a video in which the mouth shape of the digital-human actor in the video is corrected, wherein the mouth shape correction model is a model trained by using the training method.

9 Claims, 5 Drawing Sheets

Extract, by using a mouth feature extraction module, a first mouth shape change feature based on a corresponding first mouth image in a first original video, a second mouth shape change feature based on a corresponding second mouth image in a second original video; and calculate first pixel losses of the first mouth shape change feature and the second mouth shape change feature, respectively ⸺ S1

Extract, by using a key point extraction module, a first mouth key point feature based on a first face image containing the first mouth image ⸺ S2

Extract, by using a first video module, a first cover feature based on a first video-to-frame split image corresponding to the first face image; splice the first cover feature, the first mouth key point feature, and the first mouth shape change feature and input the same to a decoder in the first video module, to obtain a first predicted face image; and calculate a weighted sum of a first discriminator loss and a second pixel loss for the first predicted face image and the first video-to-frame split image, respectively ⸺ S3

Extract, by using a second video module, a second mouth feature of the second mouth image, and a second cover feature of a second video-to-frame split image corresponding to a second face image; splice the second cover feature, the second mouth feature, and the second mouth shape change feature and input the same to a decoder in the second video module, to obtain a second predicted face image; and calculate a weighted sum of a second discriminator loss and a third pixel loss for the second predicted face image and the second video-to-frame split image, respectively ⸺ S4

In response to that the first pixel losses, the weighted sum of the second pixel loss and the first discriminator loss, and the weighted sum of the third pixel loss and the second discriminator loss all meet a convergence condition of the model, complete the training to generate a target mouth shape correction model ⸺ S5

FIG. 6

MOUTH SHAPE CORRECTION MODEL, AND MODEL TRAINING AND APPLICATION METHOD

CROSS-REFERENCE

This application claims the priority to Chinese Patent Application No. 202210971051.3, filed with the China National Intellectual Property Administration on Aug. 15, 2022, and entitled "MOUTH SHAPE CORRECTION MODEL, AND MODEL TRAINING AND APPLICATION METHODS", which is incorporated herein by reference in its entirety.

FIELD OF THE INVENTION

This disclosure relates to the technical field of natural human-computer interactions, and in particular, to a model for correcting a mouth shape of a digital-human actor in a video, and model training and application methods.

BACKGROUND OF THE INVENTION

Mouth shape transition in a digital human generation process refers to video presentation based on a target project. During the mouth shape transition, a real actor with a good mouth shape is first selected to record a speaking performance, and then a mouth-shape feature of the real actor is transferred to a digital-human actor in a target project video, so that the digital-human actor speaks according to the mouth shape of the real actor. The mouth shape transition process requires visual experience to better meet requirements of a project, while true expressions of the actor are preserved in the target project video as possible.

A preset model needs to be trained in the mouth shape transition process. However, in the process of training the model, it is inevitable to learn about mouth shape defects (mouth shape defects in the present invention specifically refer to excessive exposure of teeth during speaking, mouth opening too large or too small, and the like) of training data. Therefore, in the mouth shape transition process performed by using the trained model, it is inevitable to be affected by the mouth shape defects learned by the model. As a result, when the mouth shape of the real actor has defects, mouth shape driving performed by the digital-human actor based on the defective model may reproduce the mouth shape defects. On the basis of the foregoing phenomenon, an implementation process of a technology of driving a mouth shape by two-dimensional digital human voice in related technologies relies on deep learning, which has an inherent shortcoming and cannot get rid of a mouth-shape feature of a real actor in a video. Therefore, when the real actor has an obvious mouth shape defect, the mouth shape defect of the digital-human actor that is presented by a voice-driven mouth shape may be exposed more obviously.

At present, in the related technologies, AI technologies such as expression driving expression can be used for mouth shape correction to a certain extent. However, according to the foregoing related technologies, not only the mouth shape is changed, but also a true expression of a target actor is greatly affected. However, according to requirements of an application scenario, in the mouth shape transition process, it is required to preserve a true expression of the actor in the target project video as possible. Therefore, although mouth shape correction can be performed to a certain extent by using the related technologies, the related technologies cannot be applied to overall services of expression driving expression.

Regarding the problem in the related technologies that mouth shape correction cannot be performed on a premise that the true expression of the actor is preserved, there is no effective solutions in the related technologies.

SUMMARY OF THE INVENTION

Embodiments of this disclosure provide a mouth shape correction model, and model training and application methods, to resolve at least a technical problem in related technologies that mouth shape correction cannot be performed on a premise that a true expression of an actor is preserved.

In an embodiment of this disclosure, a mouth shape correction model is provided, including a mouth feature extraction module, a key point extraction module, a first video module, a second video module, and a discriminator, wherein the mouth feature extraction module is configured to obtain a mouth image corresponding to a face in a to-be-corrected mouth shape video, and extract a mouth shape change feature;

the key point extraction module is configured to obtain a face image containing the mouth image in the to-be-corrected mouth shape video, and extract a mouth key point feature;

the first video module is configured to obtain a video-to-frame split image corresponding to the face image; mask a mouth in the video-to-frame split image to obtain a mouth-covered image; extract a cover feature; and splice the cover feature, the mouth key point feature, and the mouth shape change feature and input the same to a decoder in the first video module, to obtain a predicted face image;

the second video module is configured to extract a mouth feature from the mouth image; mask a mouth area in the predicted face image to obtain a predicted face cover feature; and splice the predicted face cover feature, the mouth feature, and the mouth shape change feature and input the same to a decoder in the second video module, to obtain a mouth-shape-corrected face image; and the discriminator is configured to calculate discriminator losses in the first video module and the second video module; determine whether the predicted face image and the mouth-shape-corrected face image are real face images based on the discriminator losses; and if a determining result is yes, output the predicted face image and the mouth-shape-corrected face image.

In an embodiment of this disclosure, a training method for training a mouth shape correction model is further provided, applicable to the foregoing model, and including: by using a mouth feature extraction module, extracting a first mouth shape change feature based on a corresponding first mouth image in a first original video; extracting a second mouth shape change feature based on a corresponding second mouth image in a second original video; and calculating first pixel losses of the first mouth shape change feature and the second mouth shape change feature, respectively;

extracting, by using a key point extraction module, a first mouth key point feature based on a first face image containing the first mouth image;

by using a first video module, extracting a first cover feature based on a first video-to-frame split image corresponding to the first face image; splicing the first cover feature, the first mouth key point feature, and the first mouth shape change feature and inputting the same to a decoder in the first video module, to obtain a first predicted face image; and calculating a weighted sum of a first discriminator loss and a second pixel loss for the first predicted face image and the first video-to-frame split image, respectively;

by using a second video module, extracting a second mouth feature of the second mouth image, and a second cover feature of a second video-to-frame split image corresponding to a second face image; splicing the second cover feature, the second mouth feature, and the second mouth shape change feature and inputting the same to a decoder in the second video module, to obtain a second predicted face image; and calculating a weighted sum of a second discriminator loss and a third pixel loss for the second predicted face image and the second video-to-frame split image, respectively; and in response to that the first pixel losses, the weighted sum of the second pixel loss and the first discriminator loss, and the weighted sum of the third pixel loss and the second discriminator loss all meet a convergence condition of the model, completing the training to generate a target mouth shape correction model.

In an embodiment of this disclosure, before training a preset mouth shape correction model, the method further includes:

selecting two sets of mouth shape videos recorded by a real actor, which are the first original video and the second original video respectively, wherein the first original video is a video with a correct mouth shape of the actor, and the second original video is a video with a defective mouth shape of the actor;

inputting the first original video and preset audio to a preset model for driving a mouth shape by audio, to generate a first video;

inputting the second original video and the preset audio to the preset model for driving a mouth shape by audio, to generate a second video, wherein the first video and the second video are videos when a digital human performs corresponding actions based on the preset audio;

deleting video segments with incorrect pronunciation of the digital human in the first video and the second video, to obtain a first filtered video and a second filtered video; and obtaining the first face image and the second face image by using the first filtered video and the second filtered video.

In an embodiment of this disclosure, the obtaining the first face image and the second face image by using the first filtered video and the second filtered video includes:

performing video-to-frame splitting on the first filtered video and the second filtered video, to obtain the corresponding first video-to-frame split image and the corresponding second video-to-frame split image;

cropping digital-human mouth areas in frames based on the first video-to-frame split image and the second video-to-frame split image, to obtain the corresponding first mouth image and the corresponding second mouth image;

zooming in/out the first mouth image and the second mouth image to a same target size; and obtaining facial key points through a facial recognition library, and cropping faces in the first filtered video and the second filtered video based on an external rectangle of the facial key points, to obtain the corresponding first face image and the corresponding second face image.

In an embodiment of this disclosure, the extracting, by using a key point extraction module, a first mouth key point feature based on a first face image containing the first mouth image specifically includes:

obtaining a facial depth key point in the first face image; and selecting and saving a mouth-area depth key point in the facial depth key point, to obtain the first mouth key point feature in the first face image.

In an embodiment of this disclosure, a specific step of extracting the first cover feature and the second cover feature is:

by using the first video module, masking a digital-human mouth area in the first video-to-frame split image to obtain a first mouth-covered image, and extracting the first cover feature of the first mouth-covered image; and by using the second video module, masking a digital-human mouth area in the second video-to-frame split image to obtain a second mouth-covered image, and extracting the second cover feature of the second mouth-covered image.

In an embodiment of this disclosure, after the completing the training to generate a target mouth shape correction model, the method further includes:

obtaining a processed image based on a second mouth-covered image by using the trained first video module;

cropping a digital-human mouth area in the processed image, to obtain a corresponding processed mouth image; and extracting a processed mouth shape change feature based on the processed mouth image by using the trained mouth feature extraction module.

In an embodiment of this disclosure, after the completing the training to generate a target mouth shape correction model, the method further includes:

masking the digital-human mouth area in the processed image by using the trained second video module, to obtain a processed mouth-covered image;

extracting a corresponding processed mouth feature and a corresponding processed mouth cover feature based on the processed mouth image and the processed mouth-covered image; and splicing the processed mouth feature, the processed mouth-covered image, and the processed mouth shape change feature by using the decoder in the trained second video module, to obtain a second mouth corrected image, wherein the second mouth corrected image is an image in which a mouth defect in the second video-to-frame split image is corrected.

In an embodiment of this disclosure, a method is also provided, including: inputting a video in which a mouth shape of a digital-human actor is to be corrected and corresponding audio into a mouth shape correction model, to obtain a video in which the mouth shape of the digital-human actor in the video is corrected, wherein the mouth shape correction model is a model trained by using the training method according to any one of foregoing embodiments.

It can be learned from the foregoing technical solutions that, based on the model provided in this disclosure, there are specifically the following technical effects.

1. According to the present invention, the mouth feature extraction module is added on the basis of a model structure and a training method of a pupil correction scheme in related technologies, and is applied to mouth shape correction. In this way, the mouth shape is corrected without affecting transition of other facial expressions.

2. The present invention provides a relatively cheap but efficient data annotation method. According to this method, a same model for driving a mouth shape by audio is used to generate two sets of speech videos under a same piece of audio, to ensure complete alignment between time and contents of the two sets of videos, thereby greatly improving model accuracy. The model needs to learn parameters about mouth shape changes, not related to mouth shape changes of the two sets of speech videos. Therefore, the model is not affected by accuracy of models such as the model for driving a mouth shape by audio.

BRIEF DESCRIPTION OF THE DRAWINGS

The accompanying drawings described herein are used to provide further understanding of this disclosure, and constitute a part of this disclosure. The exemplary embodiments and descriptions of this disclosure are used to explain this disclosure, and do not constitute an improper limitation to this disclosure. In the accompanying drawings:

FIG. 6 is a flowchart of a training method for training a mouth shape correction model according to this disclosure.

DETAILED DESCRIPTION OF THE EMBODIMENTS

This disclosure is described below in detail with reference to the accompanying drawings and in combination with the embodiments. It should be noted that the embodiments in this disclosure and the features in the embodiments can be combined with each other in the case of no conflict.

It should be noted that the terms "first", "second", and the like in this specification, the claims, and the accompanying drawings of this disclosure are intended to distinguish between similar objects, but are not necessarily intended to describe a particular sequence or a sequential order.

Figure 1:
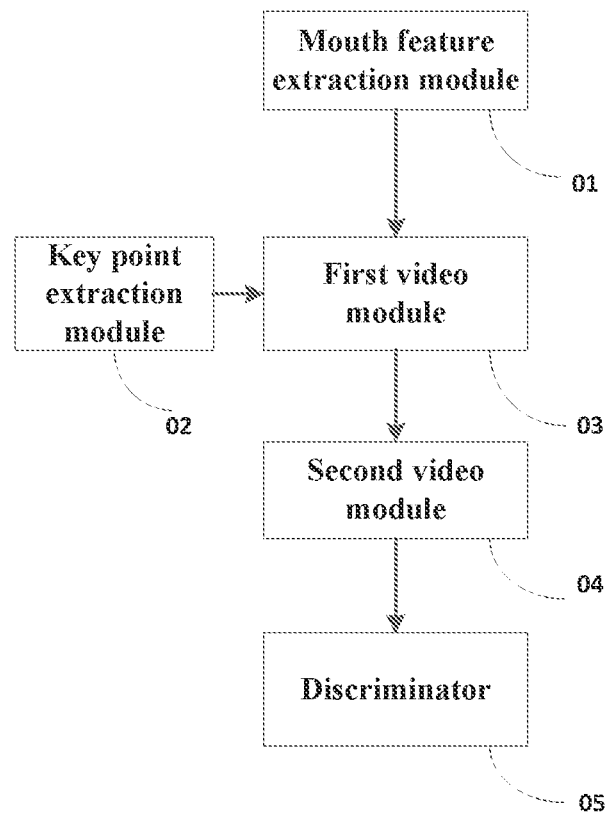
FIG. 1 is a structural schematic diagram of a mouth shape correction model according to this disclosure.

As shown in FIG. 1, an embodiment of this disclosure provides a mouth shape correction model, including a mouth feature extraction module 01, a key point extraction module 02, a first video module 03, a second video module 04, and a discriminator 05.

Figure 2:
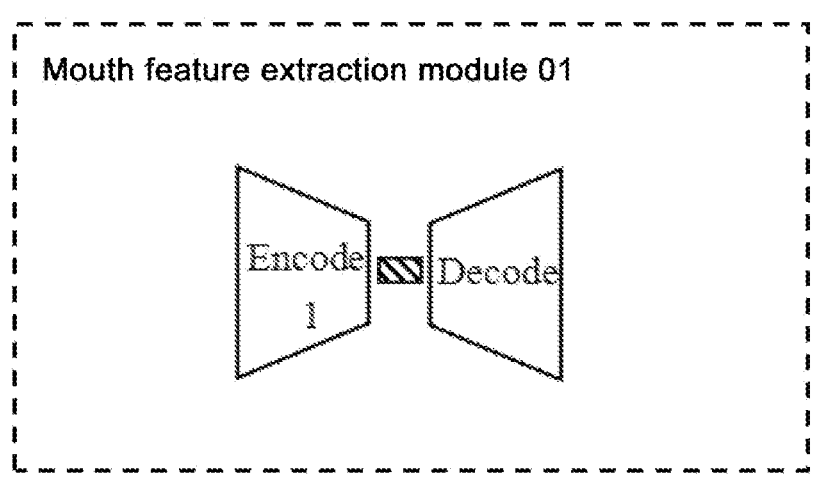
FIG. 2 is a structural schematic diagram of a mouth feature extraction module according to this disclosure.

The mouth feature extraction module 01 is configured to obtain a mouth image corresponding to a face in a to-be-corrected mouth shape video, and extract a mouth shape change feature. It should be noted that, data about a mouth-area depth key point is not directly transferred in this disclosure. Before a network is accessed, referring to FIG. 2, in this disclosure, a deeper-level feature is first extracted through a convolutional network layer. Subsequently, the deeper-level feature is spliced with a corresponding Encode 1 (encoder) end feature in the mouth feature extraction module 01, and then is transferred into a corresponding Decode (decoder). Specifically, the mouth feature extraction module 01 still uses a backbone network in GazeAnimation.

Figure 3:
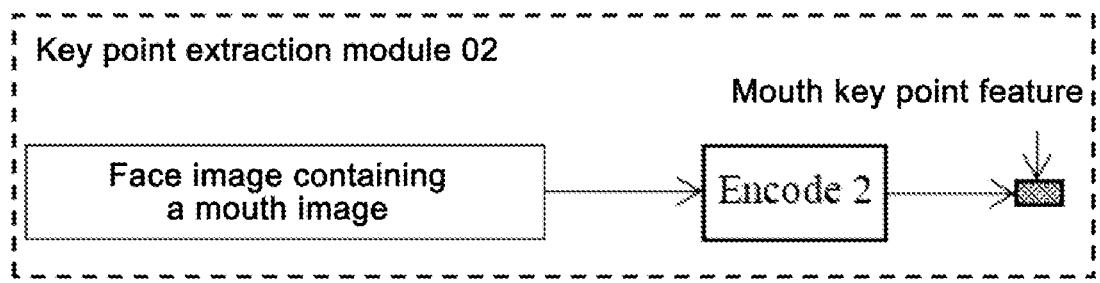
FIG. 3 is a structural schematic diagram of a key point extraction module according to this disclosure.

Referring to FIG. 3, the key point extraction module 02 is configured to obtain a face image containing the mouth image in the to-be-corrected mouth shape video, and extract a mouth key point feature. It should be noted that the key point extraction module 02 is merely a feature extractor for a three-dimensional mouth key point, which drives a forward inference prediction of the model by extracting the mouth key point feature. Further, during training of the model, a back propagation process is required, which has been designed in tensorflow and pytorch frameworks, and does not require attention in later development. The model is trained and saved. During use, the model only requires forward inference once.

Figure 4:
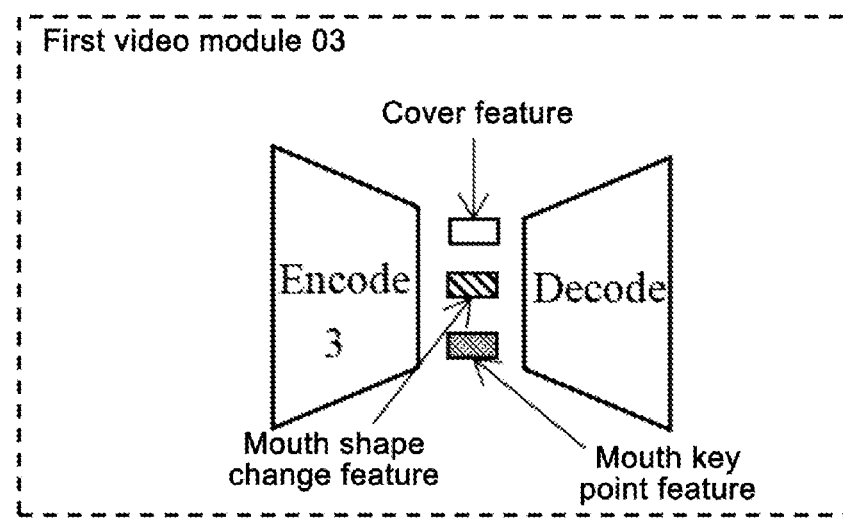
FIG. 4 is a structural schematic diagram of a first video module according to this disclosure.
Figure 5:
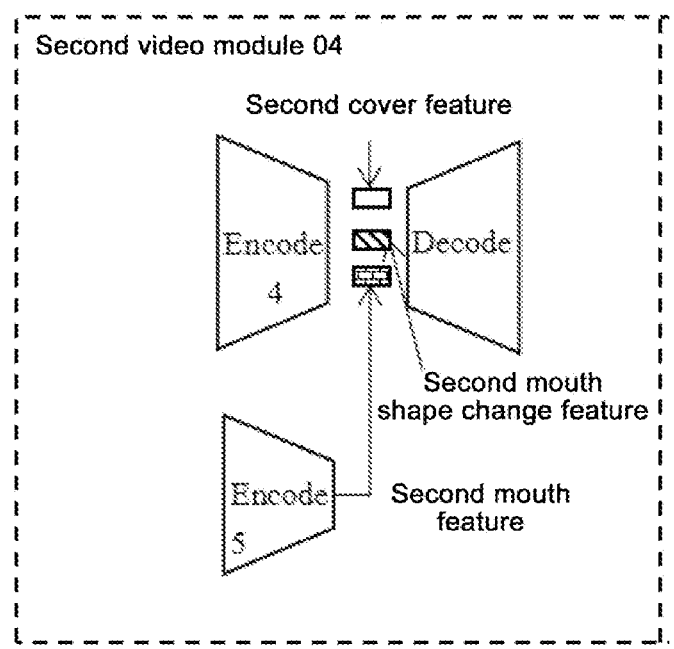
FIG. 5 is a structural schematic diagram of a second video module according to this disclosure.

Referring to FIG. 4, the first video module 03 is configured to obtain a video-to-frame split image corresponding to the face image; mask a mouth in the video-to-frame split image to obtain a mouth-covered image; extract a cover feature; and splice the cover feature, the mouth key point feature, and the mouth shape change feature and input the same to a decoder in the first video module, to obtain a predicted face image. Referring to FIG. 5, the second video module 04 is configured to extract a mouth feature from the mouth image; mask a mouth area in the predicted face image to obtain a predicted face cover feature; and splice the predicted face cover feature, the mouth feature, and the mouth shape change feature and input the same to a decoder in the second video module, to obtain a mouth-shape-corrected face image.

Overall network architectures of the first video module 03 and the second video module 04 described above are the same as that of GazeAnimation. A difference is that in this disclosure, new network structures are further designed for the two modules. At the same time, the mouth key point feature is also added to drive changes of a mouth shape. Further, for a residual network part in the two modules, some adjustments are also made in this disclosure, as shown in FIG. 5. In this case, while a quantity of parameters is reduced, accuracy is still reliable. Nine resnet_blocks (residual network modules) are connected in series in the convolutional network layers of an Encode 3 part in the first video module 03 and an Encode 4 part in the second video module 04. However, in a Decode part, three-layer deconvolution is used in this disclosure to generate an image. Therefore, the first video module 03 and the second video module 04 do not share a same network.

The discriminator 05 is configured to calculate discriminator losses in the first video module 03 and the second video module 04; determine whether the predicted face image and the mouth-shape-corrected face image are real face images based on the discriminator losses; and if a determining result is yes, output the predicted face image and the mouth-shape-corrected face image. Specifically, in this disclosure, an existing patchGan is selected as the discriminator for the mouth shape correction model. The discriminator maps an input image into n*n patches (blocks), calculates a probability for which each block is true, and finally outputs an average probability value. A name of the discriminator selected herein is patchGan; that is, it is a discriminator of a Gan network. A matrix transferred into the patchGan may be mapped into n*n patches, and then a probability for which each patch is true is calculated, and finally, an average probability value is output.

It should be noted that, to enable the model provided in this disclosure to generate clearer images at last, some changes are made to the convolutional network layers of the Encode 3 in the first video module 03 and the Encode 4 in the second video module 04 and the corresponding Decodes. A specific main structure of the network is as described above. Moreover, when input layers of the Encode 3 and the Encode 4 and an output layer of the Decode are selected as 7*7 convolutional layers, a generated image has an optimal effect. In addition, the residual network provided in this disclosure has more light-weighting computational parameters as compared with an existing residual network, while quality of the generated image is not reduced.

Referring to FIG. 6, an embodiment of this disclosure further provides a training method for training a mouth shape correction model, which is applicable to the foregoing model. The method includes the following steps.

S1, by using a mouth feature extraction module 01, extract a first mouth shape change feature based on a corresponding first mouth image in a first original video and extract a second mouth shape change feature based on a corresponding second mouth image in a second original video; and calculate first pixel losses of the first mouth shape change feature and the second mouth shape change feature.

Particularly, the mouth feature extraction module 01 in this embodiment is mainly used for prediction. Therefore, there is no need to add a discriminator. The first mouth shape change feature and the second mouth shape change feature are extracted by using the mouth feature extraction module 01 only, and an Eecode 1 part in the mouth feature extraction module 01 is used as a mouth shape change feature extractor for a first video module 03 and a second video module 04. Particularly, in this disclosure, the mouth images corresponding to the first original video and the second original video are used to train a mouth area, and the corresponding first mouth shape change feature and the corresponding second mouth shape change feature are extracted. In addition, first pixel losses of the first mouth shape change feature and the second mouth shape change feature are respectively calculated through a loss function L1_loss (a specific formula for L1_loss loss is L1LossFunction=$\Sigma_{i=1}^{n}|y_{true}-y_{predicted}|$, where $y_{true}$ represents a true value and ypredicted represents a predicted value. L1_Loss: a sum of absolute differences of the true value and the predicted value. The true value and the predicted value are actually multi-dimensional tensors (arrays), where absolute differences are taken for values at a same position in the two tensors, and the absolute differences are added).

S2, extract, by using a key point extraction module 02, a first mouth key point feature based on a first face image containing the first mouth image. It should be noted that the key point extraction module 02 is merely a mouth key point feature extractor. Moreover, in this disclosure, only the key point extraction module 02 is used as the mouth key point feature extractor for the first original video, and only the first mouth key point feature corresponding to the first original video is used to drive forward inference prediction of the mouth shape correction model.

Specifically, the forward inference prediction means that during training of the model, a back propagation process is required, which has been designed in the existing tensorflow and pytorch frameworks, and does not require attention in later development. In this disclosure, the trained model needs to be saved. In this way, during specific use, the model only requires forward inference once.

S3, by using a first video module 03, extract a first cover feature based on a first video-to-frame split image corresponding to the first face image; splice the first cover feature, the first mouth key point feature, and the first mouth shape change feature and input the same to a decoder in the first video module 03, to obtain a first predicted face image; and calculate a weighted sum of a first discriminator loss and a second pixel loss for the first predicted face image and the first video-to-frame split image.

Specifically, as shown in FIG. 4, a mouth-area feature of any frame of image in the first original video (that is, the first video-to-frame split image described above) is masked to obtain a first cover image. The first cover image is performed with feature extraction by using an Encode 3 to obtain the first cover feature. Subsequently, the first cover feature, and the first mouth key point feature and the first mouth shape change feature that are obtained described above are spliced and are transferred to a Decode part. Further, after the first video module 03 is trained, the weighted sum of the first discriminator loss and the second pixel loss needs to be calculated for the first predicted face image and the first video-to-frame split image, respectively.

S4, by using a second video module 04, extract a second mouth feature of the second mouth image, and a second cover feature of a second video-to-frame split image corresponding to a second face image; splice the second cover feature, the second mouth feature, and the second mouth shape change feature and input the same to a decoder in the second video module, to obtain a second predicted face image; and calculate a weighted sum of a second discriminator loss and a third pixel loss for the second predicted face image and the second video-to-frame split image, respectively.

It should be noted that, as shown in FIG. 5, the second mouth feature is a feature extracted separately by using an Encode 5 in the second video module 04. It should be noted that the Encode 5 differs from the Encode 1 in the mouth feature extraction module 01 in that the Encode 5 extracts a mouth feature only, thereby ensuring that the model has information about the mouth feature. Meanwhile, the second mouth shape change feature corresponding to the second mouth image is extracted by using the Encode 1 in the mouth feature extraction module. A mouth area of any frame of image (that is, the second video-to-frame split image described above) in the second original video is masked to obtain a second mouth-covered image. The second mouth-covered image is performed with feature extraction by using an Encode 4 to obtain the second cover feature. Subsequently, the second cover feature, and the second mouth feature and the second mouth shape change feature that are obtained described above are spliced and are transferred to a Decode part.

In some embodiments, specific steps of extracting the first cover feature and the second cover feature are: by using the first video module 03, masking a mouth area of the digital-human in the first video-to-frame split image to obtain a first mouth-covered image, and extracting the first cover feature of the first mouth-covered image; by using the second video module 04, masking a mouth area of the digital-human in the second video-to-frame split image to obtain a second mouth-covered image, and extracting the second cover feature of the second mouth-covered image.

S5. When the first pixel losses, the weighted sum of the second pixel loss and the first discriminator loss, and the weighted sum of the third pixel loss and the second discriminator loss all meet a convergence condition of the model, complete the training to generate a target mouth shape correction model.

In some embodiments, before training the preset mouth shape correction model, the method further includes: S11, selecting two sets of mouth shape videos recorded by a real actor, which are the first original video and the second original video, wherein the first original video is a video with a correct mouth shape of the actor, and the second original video is a video with a defective mouth shape of the actor;

Specifically, data preprocessing is required before training the model. In this disclosure, two sets of videos are first selected, which are respectively a video with a good mouth shape (that is, the first original video) and a video with a poor mouth shape (that is, the second original video). Both the first original video and the second original video are videos recorded by the real actor. The mouth shape of the first original video is relatively good during the recording, and has no obvious defects. There are some defects in the mouth shape of the second original video during the recording.

Figure 7:
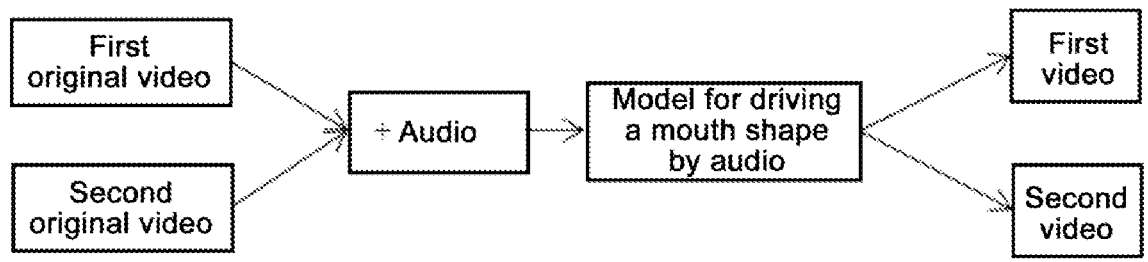
FIG. 7 is a flowchart of generating process of a first video and a second video according to this disclosure.

S12, inputting the first original video and preset audio to a preset model for driving a mouth shape by audio, to generate a first video;

S13, inputting the second original video and the preset audio to the preset model for driving a mouth shape by audio, to generate a second video, wherein the first video and the second video are videos when a digital human performs corresponding actions based on the preset audio;

Specifically, referring to FIG. 7, the first original video and the preset audio are used as inputs, then a new video, that is, the first video, is generated by using the model for driving a mouth shape by audio, and is output. Similarly, the second original video and the preset audio are used as inputs, then a new video, that is, the second video, is generated by using the model for driving a mouth shape by audio, and is output.

It should be noted that both the first original video and the second original video described above are displayed by a digital-human video, that is, are displayed according to content of the preset audio. During processes of generating the first original video and the second original video, the preset audio is a same audio segment. The model for driving a mouth shape by audio is also a pre-trained model, and is configured to generate a corresponding digital-human video based on a video and audio of a real person.

S14, deleting video segments with incorrect pronunciation of the digital human in the first video and the second video, to obtain a first filtered video and a second filtered video.

It should be noted that in step S14, a video segment with a relatively correct mouth shape is filtered out from the video. However, the correct mouth shape in this step is not a same concept as the good or defective mouth shape in step S11. A correct mouth shape indicates whether there is incorrect pronunciation when the digital human pronounces a word, while the defective mouth shape specifically refers to excessive exposure of teeth, mouth opening too large or too small, or the like during speech. Therefore, in step S14, possible video segments with incorrect pronunciation in the first original video and the second original video are filtered out.

S15, obtaining the first face image and the second face image by using the first filtered video and the second filtered video.

In some embodiments, obtaining the first face image and the second face image by using the first filtered video and the second filtered video includes: S151, performing video-to-frame splitting on the first filtered video and the second filtered video, to obtain the corresponding first video-to-frame split image and the corresponding second video-to-frame split image; S152, cropping digital-human mouth areas in frames based on the first video-to-frame split image and the second video-to-frame split image, to obtain the corresponding first mouth image and the corresponding second mouth image; S153, zooming in/out the first mouth image and the second mouth image to a same target size; and S154, obtaining facial key points through a facial recognition library, and cropping faces in the first filtered video and the second filtered video based on an external rectangle of the facial key points, to obtain the corresponding first face image and the corresponding second face image.

For example, the obtained first filtered video and second filtered video are performed with frame splitting; that is, they are split into frames, respectively. The digital-human mouth areas in the videos are cropped respectively, and the cropped mouth images are scaled in/out to a same size (32*32 or 64*64). A dlib library (that is, the facial recognition library) is used to obtain the facial key points, and the faces in the first filtered video and the second filtered video are cropped based on the external rectangle of the facial key points.

In some embodiments, extracting, by the key point extraction module 02, the first mouth key point feature based on the first face image containing the first mouth image specifically includes: obtaining a facial depth key point in the first face image; and selecting and saving a mouth-area depth key point in the facial depth key point, to obtain the first mouth key point feature in the first face image.

For example, a mouth-area depth key point in the first filtered video is obtained by using an official packaged mediapipe tool, to serve as mouth-area depth information. The process described above is to obtain the facial depth key point in the first filtered video, and then select and save the mouth-area depth key point on this basis, to obtain the mouth-area depth key point in the first filtered video.

In some embodiments, after completing the training to generate the target mouth shape correction model, the method further includes: obtaining a processed image based on the second mouth-covered image by using the trained first video module 03; cropping a digital-human mouth area in the processed image, to obtain a corresponding processed mouth image; and extracting a processed mouth shape change feature based on the processed mouth image by using the trained mouth feature extraction module 01.

In some embodiments, after completing the training to generate the target mouth shape correction model, the method further includes: masking the digital-human mouth area in the processed image by using the trained second video module 04, to obtain a processed mouth-covered image; extracting a corresponding processed mouth feature and a corresponding processed mouth cover feature based on the processed mouth image and the processed mouth-covered image; and splicing the processed mouth feature, the processed mouth-covered image, and the processed mouth shape change feature by using the decoder in the trained second video module 04, to obtain a second mouth corrected image. The second mouth corrected image is an image in which a mouth defect in the second video-to-frame split image is corrected.

For example, after training of the mouth shape correction model is completed, the second mouth-covered image is transferred to the trained first video module 03 to obtain the processed image, and then mouth area masking is performed on the processed image, to obtain a processed mouth-covered image. Subsequently, the processed mouth-covered image is transferred to the Encode 4 part of the trained second video module 04 to obtain the processed mouth cover feature. The mouth area of the processed image is cropped to obtain the corresponding processed mouth image. Feature extraction is performed on the processed mouth image to obtain the processed mouth feature that has a same size with the processed mouth cover feature. Further, feature extraction is performed on the processed mouth image by using the trained mouth feature extraction module 01, to obtain the processed mouth shape change feature.

Finally, the obtained processed mouth cover feature and the processed mouth feature are spliced and are transferred to a Decode part in the trained second video module, to finally obtain the image in which the mouth defect in the second video-to-frame split image is corrected.

Further, this disclosure further provides a method for correcting a mouth shape of a digital-human actor in a video, including: inputting a video in which a mouth shape of a digital-human actor is to be corrected and corresponding audio into a mouth shape correction model, to obtain a video in which the mouth shape of the digital-human actor in the video is corrected. The mouth shape correction model is a model trained by using any one of the foregoing training methods.

During specific use, the video in which the mouth shape of the digital-human actor is corrected can be obtained by merely inputting the video in which the mouth shape of the digital-human actor is to be corrected and the corresponding audio into the trained mouth shape correction model provided in this disclosure.

In summary, according to this disclosure, the mouth feature extraction module 01 is added on the basis of a model structure and a training method of a pupil correction scheme in related technologies, and is applied to mouth shape correction. In this way, the mouth shape is corrected without affecting transition of other facial expressions. In addition, the method for correcting a mouth shape of a digital-human actor in a video based on pupil correction framework in this disclosure has significant effects in actual measurement processes, and is superior to a previous visual correction scheme. On this basis, the mouth feature extraction module 01 is added in this disclosure, so that a result of changing the mouth shape becomes more reliable.

Meanwhile, this disclosure provides a relatively cheap but efficient data annotation method. To be specific, according to this method, a same model for driving a mouth shape by audio is used to generate two sets of speech videos under a same piece of audio, to ensure complete alignment between time and contents of the two sets of videos, thereby greatly improving model accuracy. The model needs to learn parameters about mouth shape changes, but it does not matter how good mouth shape changes of the two sets of speech videos are. Therefore, the model is not affected by accuracy of models such as the model for driving a mouth shape by audio.

The terms "a plurality of embodiments", "some embodiments", "one embodiment", or "embodiment" mentioned throughout this specification mean that specific features, components or characteristics described in combination with the embodiments is included in at least one embodiment. Therefore, the phrases such as "in a plurality of embodiments", "in some embodiments", "in at least one another embodiment", or "in an embodiment" that appear throughout this specification may not necessarily refer to same embodiments. In addition, in one or more embodiments, specific features, components, or characteristics can be combined in any suitable manner. Therefore, without limitation, specific features, components, or characteristics illustrated or described in combination with one embodiment can be entirely or partially combined with features, components, or characteristics of one or more other embodiments. Such modifications and variations all fall within the scope of this disclosure.

For similar parts between the embodiments provided in this disclosure, reference can be made to each other. The specific implementations described above are merely some examples under a general concept of this disclosure, and do not constitute any limitation to the protection scope of this disclosure. For a person skilled in the art, any other implementations derived according to the solutions of this disclosure without an effective effort all fall within the protection scope of this disclosure.

Merely preferred implementations of this disclosure are described above. It should be noted that for persons of ordinary skills in the art, improvements and modifications can be made without departing from the principles of this disclosure, and these improvements and modifications should also be considered as being subject to the protection scope of this disclosure.

What is claimed is:

1. A mouth shape correction model, comprising a mouth feature extraction module, a key point extraction module, a first video module, a second video module, and a discriminator, wherein
  the mouth feature extraction module is configured to obtain a mouth image corresponding to a face in a to-be-corrected mouth shape video, and extract a mouth shape change feature;
  the key point extraction module is configured to obtain a face image containing the mouth image in the to-be-corrected mouth shape video, and extract a mouth key point feature;
  the first video module is configured to obtain a video-to-frame split image corresponding to the face image; mask a mouth in the video-to-frame split image to obtain a mouth covered image; extract a cover feature; and splice the cover feature, the mouth key point feature, and the mouth shape change feature and input the same to a decoder in the first video module, to obtain a predicted face image;
  the second video module is configured to extract a mouth feature from the mouth image; mask a mouth area in the predicted face image to obtain a predicted-face cover feature; and splice the predicted-face cover feature, the mouth feature, and the mouth shape change feature and input the same to a decoder in the second video module, to obtain a mouth-shape-corrected face image; and
  the discriminator is configured to calculate discriminator losses in the first video module and the second video module; determine whether the predicted face image and the mouth-shape-corrected face image are real face images based on the discriminator losses; and if a determining result is yes, output the predicted face image and the mouth-shape-corrected face image.

2. A training method for training a mouth shape correction model, applicable to the mouth shape correction model according to claim 1, and comprising:
  by using a mouth feature extraction module, extracting a first mouth shape change feature based on a corresponding first mouth image in a first original video and a second mouth shape change feature based on a corresponding second mouth image in a second original video, wherein the first original video is a video with a correct mouth shape of the actor and the second original video is a video with a defective mouth shape of the actor, and calculating first pixel losses of the first mouth shape change feature and the second mouth shape change feature, respectively;
  extracting, by using a key point extraction module, a first mouth key point feature based on a first face image containing the first mouth image;
  by using a first video module, extracting a first cover feature based on a first video-to-frame split image corresponding to the first face image; splicing the first cover feature, the first mouth key point feature, and the first mouth shape change feature and inputting the same to a decoder in the first video module, to obtain a first predicted face image; and calculating a weighted sum of a second pixel loss and a first discriminator loss for the first predicted face image and the first video-to-frame split image, respectively;

by using a second video module, extracting a second mouth feature of the second mouth image, and a second cover feature of a second video-to-frame split image corresponding to a second face image; splicing the second cover feature, the second mouth feature, and the second mouth shape change feature and inputting the same to a decoder in the second video module, to obtain a second predicted face image; and calculating a weighted sum of a third pixel loss and a second discriminator loss for the second predicted face image and the second video-to-frame split image, respectively; and in response to that the first pixel losses, the weighted sum of the second pixel loss and the first discriminator loss, and the weighted sum of the third pixel loss and the second discriminator loss all meet a convergence condition of the model, completing the training to generate a target mouth shape correction model.

3. The method according to claim 2, wherein before training a preset mouth shape correction model, the method further comprises:

selecting two sets of mouth shape videos recorded by a real actor, which are respectively the first original video and the second original video;

inputting the first original video and preset audio to a preset model for driving a mouth shape by audio, to generate a first video;

inputting the second original video and the preset audio to the preset model for driving a mouth shape by audio, to generate a second video, the first video and the second video being videos when a digital human performs corresponding actions based on the preset audio;

deleting video segments with incorrect pronunciation of the digital human in the first video and the second video, to obtain a first filtered video and a second filtered video; and obtaining the first face image and the second face image by using the first filtered video and the second filtered video.

4. The method according to claim 3, wherein the obtaining the first face image and the second face image by using the first filtered video and the second filtered video comprises:

performing video-to-frame splitting on the first filtered video and the second filtered video, to obtain the corresponding first video-to-frame split image and the corresponding second video-to-frame split image;

cropping digital-human mouth areas in frames based on the first video-to-frame split image and the second video-to-frame split image, to obtain the corresponding first mouth image and the corresponding second mouth image;

zooming in/out the first mouth image and the second mouth image to a same target size; and obtaining facial key points through a facial recognition library, and cropping faces in the first filtered video and the second filtered video based on an external rectangle of the facial key points, to obtain the corresponding first face image and the corresponding second face image.

5. The method according to claim 2, wherein the extracting, by using a key point extraction module, a first mouth key point feature based on a first face image containing the first mouth image specifically comprises:

obtaining a facial depth key point in the first face image; and selecting and saving a mouth-area depth key point in the facial depth key point, to obtain the first mouth key point feature in the first face image.

6. The method according to claim 2, wherein a specific step of extracting the first cover feature and the second cover feature is:

by using the first video module, masking a digital-human mouth area in the first video-to-frame split image to obtain a first mouth-covered image, and extracting the first cover feature of the first mouth-covered image; and by using the second video module, masking a digital-human mouth area in the second video-to-frame split image to obtain a second mouth-covered image, and extracting the second cover feature of the second mouth-covered image.

7. The method according to claim 2, wherein after the completing the training to generate a target mouth shape correction model, the method further comprises:

obtaining a processed image based on a second mouth-covered image by using the trained first video module;

cropping a digital-human mouth area in the processed image, to obtain a corresponding processed mouth image; and extracting a processed mouth shape change feature based on the processed mouth image by using the trained mouth feature extraction module.

8. The method according to claim 7, wherein after the completing the training to generate a target mouth shape correction model, the method further comprises:

masking the digital-human mouth area in the processed image by using the trained second video module, to obtain a processed mouth-covered image;

extracting a corresponding processed mouth feature and a corresponding processed mouth cover feature based on the processed mouth image and the processed mouth-covered image; and splicing the processed mouth feature, the processed mouth-covered image, and the processed mouth shape change feature by using the decoder in the trained second video module, to obtain a second mouth corrected image, wherein the second mouth corrected image is an image in which a mouth defect in the second video-to-frame split image is corrected.

9. A method for correcting a mouth shape of a digital-human actor in a video, comprising:

inputting a video in which a mouth shape of a digital-human actor is to be corrected and corresponding audio into a mouth shape correction model, to obtain a video in which the mouth shape of the digital-human actor in the video is corrected, wherein the mouth shape correction model is a model trained by using the training method according to claim 2.

* * * * *